(12) United States Patent
Alam et al.

(10) Patent No.: US 12,323,727 B2
(45) Date of Patent: *Jun. 3, 2025

(54) METHOD AND SYSTEM FOR CONTENT AWARE DYNAMIC IMAGE FRAMING

(71) Applicant: GN AUDIO A/S, Ballerup (DK)

(72) Inventors: Naveed Alam, Cupertino, CA (US);
John Zhang, San Jose, CA (US);
Aurangzeb Khan, Portola Valley, CA (US)

(73) Assignee: GN AUDIO A/S (DK)

( * ) Notice: Subject to any disclaimer, the term of this patent is extended or adjusted under 35 U.S.C. 154(b) by 0 days.

This patent is subject to a terminal disclaimer.

(21) Appl. No.: 18/424,685

(22) Filed: Jan. 26, 2024

(65) Prior Publication Data

US 2024/0171697 A1 May 23, 2024

Related U.S. Application Data

(63) Continuation of application No. 17/184,583, filed on Feb. 24, 2021, now Pat. No. 11,937,008.

(51) Int. Cl.
*G06V 20/40* (2022.01)
*G06V 30/32* (2022.01)
*G06V 40/10* (2022.01)
*G09B 5/02* (2006.01)
*H04N 5/272* (2006.01)

(52) U.S. Cl.
CPC ............ *H04N 5/272* (2013.01); *G06V 20/40* (2022.01); *G06V 30/32* (2022.01); *G06V 40/107* (2022.01); *G09B 5/02* (2013.01)

(58) Field of Classification Search
CPC ....... G06V 20/40; G06V 30/32; G06V 40/107
USPC ......................................................... 382/103
See application file for complete search history.

(56) References Cited

U.S. PATENT DOCUMENTS

| 11,937,008 B2 * | 3/2024 | Alam ........................ G09B 5/02 |
| 2013/0021428 A1 | 1/2013 | Byers et al. |
| 2015/0003747 A1 | 1/2015 | Boneyk et al. |
| 2021/0084241 A1 | 3/2021 | Aluru et al. |

OTHER PUBLICATIONS

Extended European Search Report Application No. 22158466.7-1207 dated Jul. 12, 2022.
Feng Wang et al: "Lecture Video Enhancement and Editing by Integrating Posture, Gesture, and Text", IEEE Transactions on Multimedia, IEEE, USA vol. 9 no 2, Feb. 1, 2007.

* cited by examiner

*Primary Examiner* — Ayodeji O Ayotunde
(74) *Attorney, Agent, or Firm* — Vani Moodley, Esq.

(57) ABSTRACT

Embodiments of the present invention disclose techniques for outputting content aware video based on at least one a video application use case. The technique recognizes objects associated with the use case and performs enhancement of the objects based on content-aware rules, and composes at least some of the objects in an output frame based on on content-aware frame composition templates. Embodiments of the present invention also disclose systems for implementing the above techniques.

20 Claims, 5 Drawing Sheets

METHOD AND SYSTEM FOR CONTENT AWARE DYNAMIC IMAGE FRAMING

FIELD

Embodiments of the present invention relate generally to video processing.

BACKGROUND

The use of video as a a medium to deliver content has grown tremendously over the past few years. Video application use cases range from the remote instructor-related training sessions, teacher-student classroom sessions, etc.

All of these applications video application use cases may benefit from content-aware framing of the video content.

SUMMARY

According to a first aspect of the invention, there is provided a method for framing video content, comprising: receiving at least one input video stream from at least one source; applying at least one image analysis technique to recognize objects in each input video stream; isolating at least one recognized object composing an output frame comprising at least some of the recognized objects; and outputting the output frame to video client device.

According to a second aspect of the invention, they provided a system for implementing the above method Other aspects of the invention, will be apparent from the written description below.

DETAILED DESCRIPTION

In the following description, for purposes of explanation, numerous specific details are set forth in order to provide a thorough understanding of the invention. Reference in this specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not others.

Moreover, although the following description contains many specifics for the purposes of illustration, anyone skilled in the art will appreciate that many variations and/or alterations to said details are within the scope of the present invention. Similarly, although many of the features of the present invention are described in terms of each other, or in conjunction with each other, one skilled in the art will appreciate that many of these features can be provided independently of other features. Accordingly, this description of the invention is set forth without any loss of generality to, and without imposing limitations upon, the invention.

Figure 1:
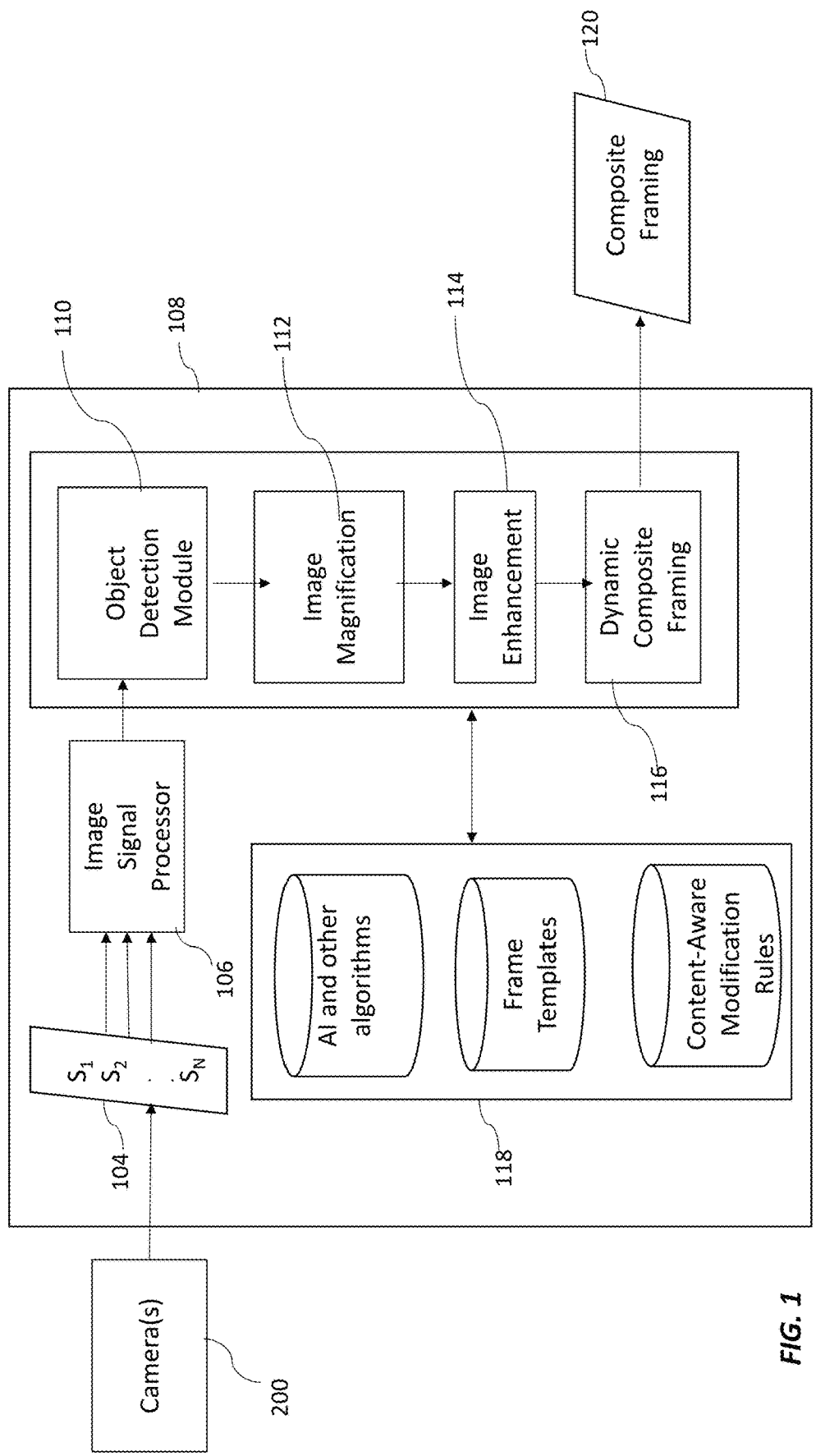
FIG. 1 shows an exemplary content-aware video processing system for composing output video streams optimized for selected video application use cases.

FIG. 1 shows a high-level block diagram of exemplary content-aware video processing system 100 for composing output video streams optimized for selected video application use cases, in accordance with one embodiment of the invention.

Referring to FIG. 1, one or more video cameras 102 may be configured to generate a plurality of input video streams indicated were reference numeral 104. According to different embodiments, the cameras 102 may be configured in accordance with different geometries. For example, for some use cases, there may be two cameras 102 positioned in orthogonal fashion thereby to capture input video streams corresponding to different portions/aspects of the scene being imaged.

The input video streams 104 are fed into an image signal processor 106 which is configured to perform certain image processing operations, which will be well understood by one of ordinary skill in the art. For example, the signal processor 106 may implement techniques for image stitching thereby to produce a panoramic video from the various input video streams.

Output from the signal processor 106 is passed to an image processing pipeline 108. According to one embodiment of the invention, the image processing pipeline comprises an object detection module 110, and image magnification module 112, an image enhancement module 114, and a dynamic opposite flaming module 116. The various functions and operations provided by these modules will be explained in greater detail later. To support the inventive content-aware processing performed in the imaging processing pipeline 108, the system may be provisioned with various databases 118 including an artificial intelligence (AI) and other algorithms database, a flame templates database, and a content-aware modification rules database. Operation of the image processing pipeline 108 based on the databases 118 will be explained with reference to the following video application use cases.

Use Case One: Remote Training Session by a Training Instructor

Figure 2:
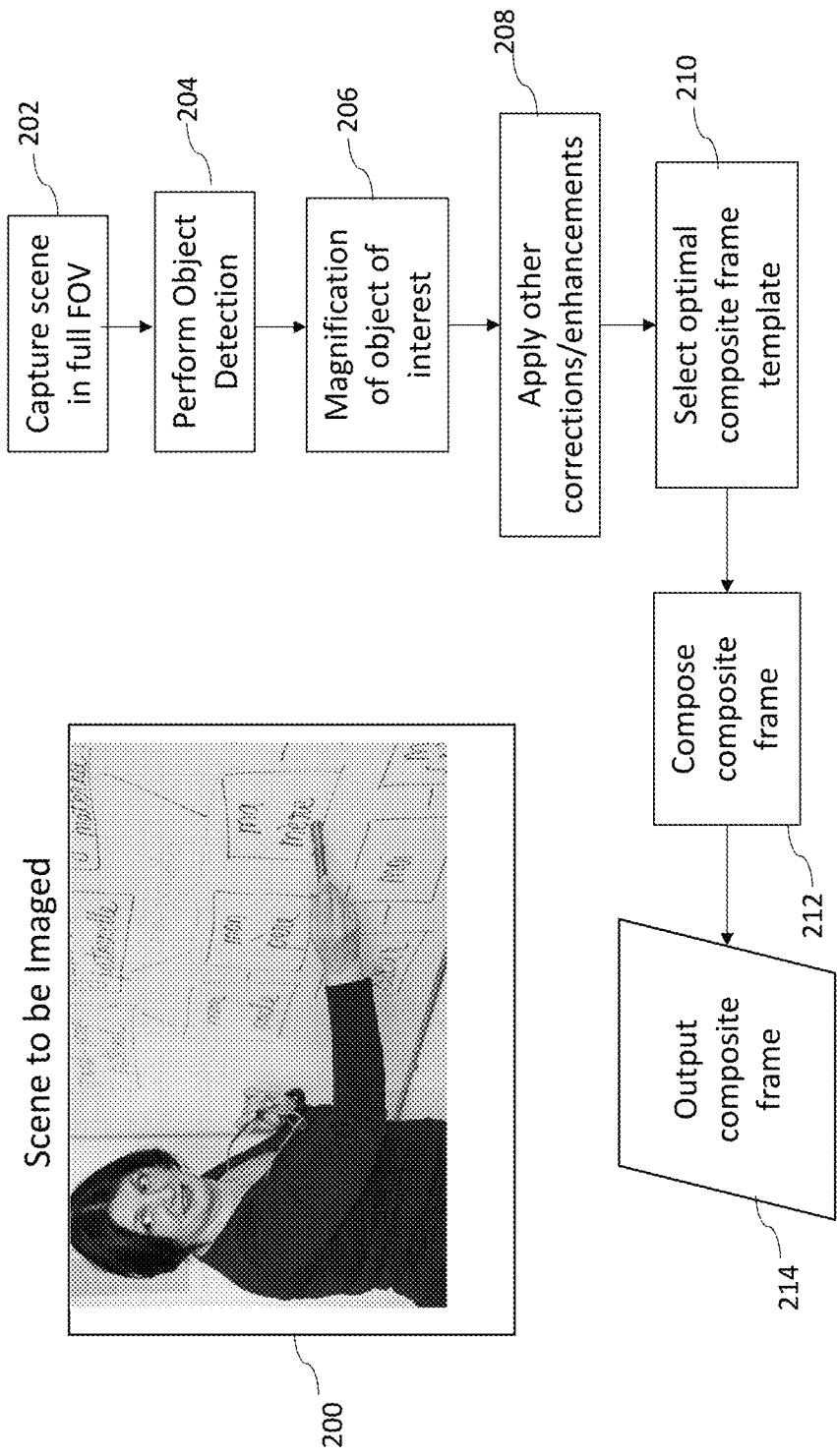
FIG. 2 illustrates content-aware video composition for the use case of a remote instructor-related training session.

Referring to FIG. 2 of the drawings, an illustrative scene 200 to be imaged may comprise a training instructor providing some training on a white board to remote users. For this application, the scene 200 is captured field-of-view (FOV) at block 202.

In accordance with one embodiment of the invention, a method for framing the video content in the scene 200 is performed, said method comprising:

(a) receiving at least one input video stream from at least one source (camera(s) 200), Each stream may the generated by a camera configured to capture dedicated aspects of the video use case. A plurality of cameras may be used, each camera being orientated to capture a different aspect of the video application use case.

(b) applying at least one image analysis technique to recognize objects in each input video stream. The video analysis technique may be selected from the group consisting of artificial intelligence (AI), machine learning (ML), and deep learning. In one embodiment, the database 118 may be provisioned with suitable AI, ML, and deep learning algorithms tuned for object detection and extraction for with this use case. For example, the algorithms may be tuned to detect the instructor, the white board, writing under white board, etc. the steps executed by the object detection module 110.

(c) isolating each recognized object, a step performed by the object detection module 110 as per block 204. According to one embodiment, isolation may comprise extracting the object from its background so that it can be enhanced and framed independently of said background.

(d) composing an output frame comprising at least some of the recognized objects; and outputting the output frame to video client device. The step is performed by the module 116 in block 212. In one embodiment, especially framing templates may be used. Each framing template may be optimized for the particular average application use case. Each template may be constructed to have dedicated zones within which particular objects may be placed based on the video use case application. The composing may include selecting a content-aware framing template that is matched to the recognized objects; and placing the extracted objects in the output frame based on the selected content-aware framing template.

(e) applying at least one content-aware modification to at least some of the recognized objects, for example, objects may be magnified as indicated by about 206. The modifications may be a selected from the group consisting of handwriting sharpening, object contrast enhancement, image straightening; image magnification; white board sharpening; and object extraction and placement in the output frame, independently of the instructor. For example for the present use case, the modification is selected from the group comprising extracting a notebook on the desk for presentation in the output frame independently of said desk; and at least one image enhancement technique to the notebook prior to presentation.

(f) outputting the composite frame as indicated in block 214.

Figure 3:
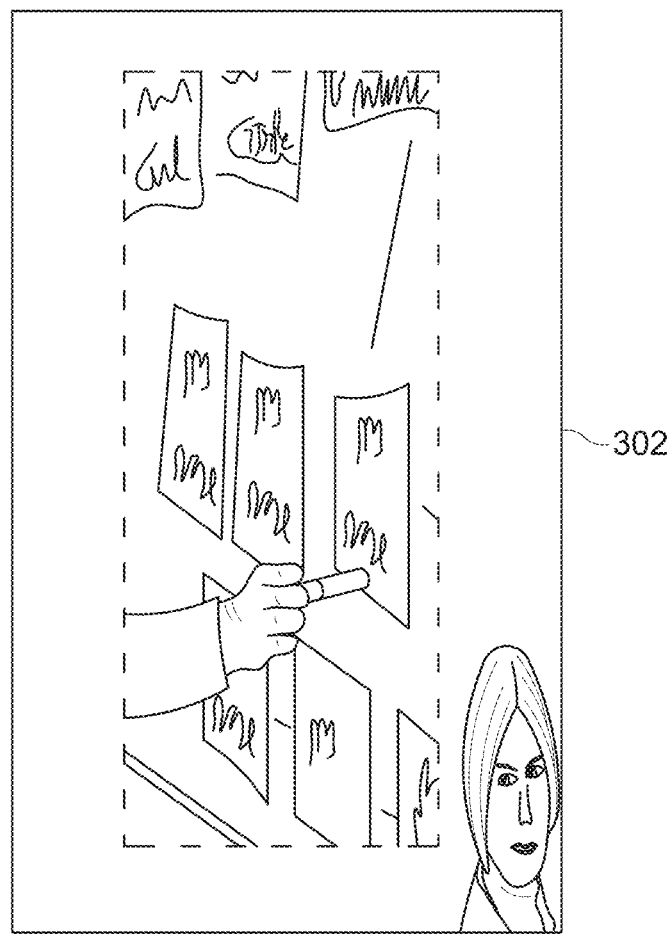
FIG. 3 illustrates an output frame generated based on content-aware rules for the remote instructor-led training session.

FIG. 3 of the drawings shows a composite frame 302, wherein the presenter has been separated from the content of the white board so that uses can focus on the white board more effectively.

Figure 4:
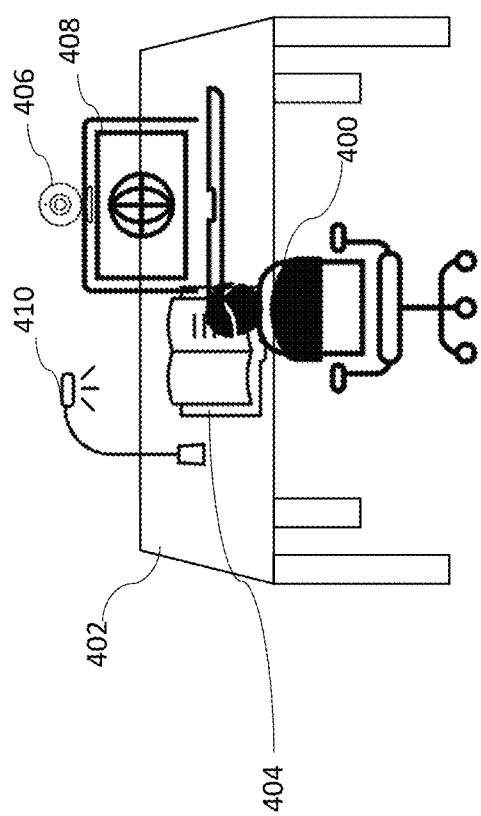
FIG. 4 illustrates content-aware video composition for the use case of a teacher-student remote classroom session.
Figure 5:
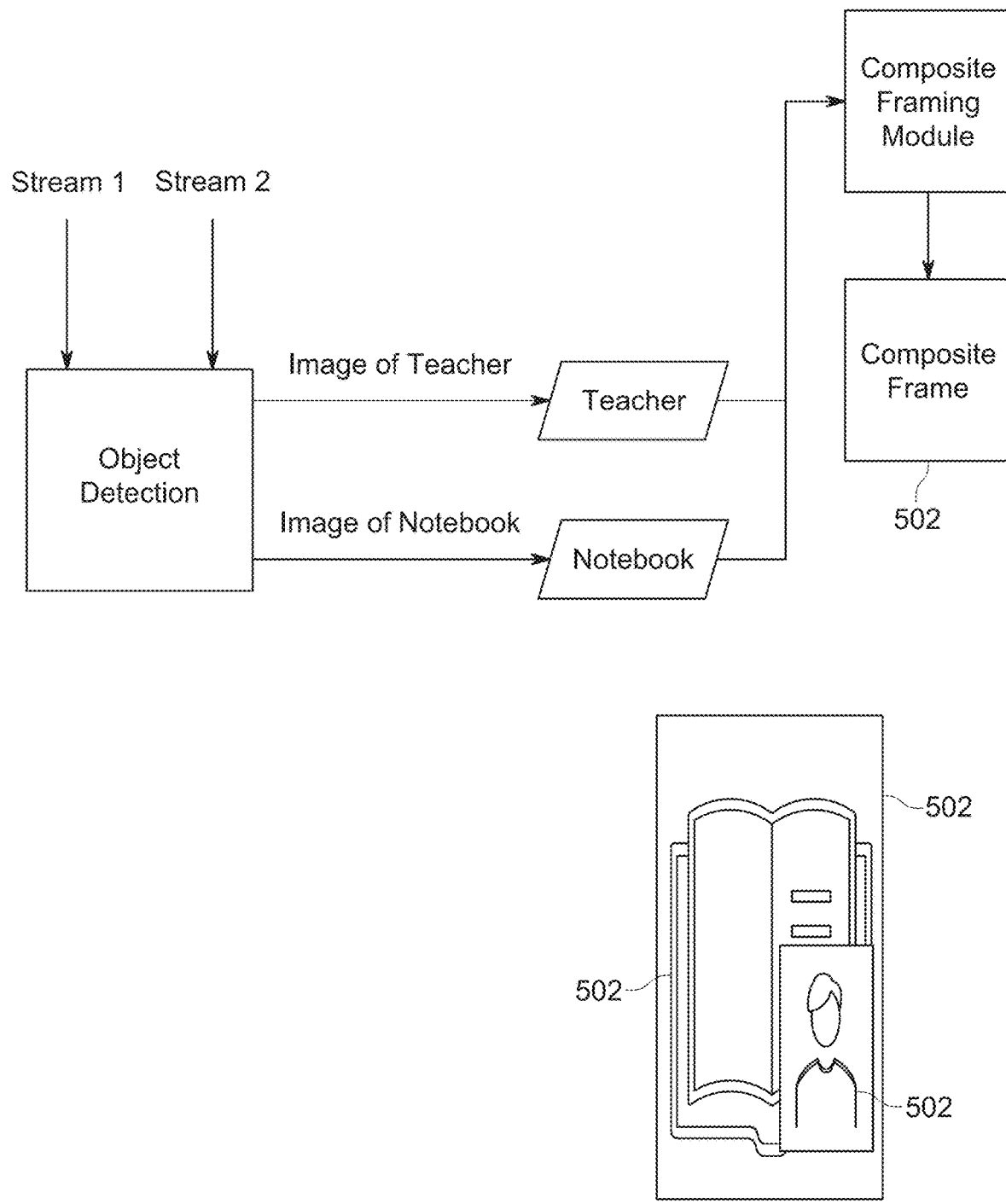
FIG. 5 illustrates an output frame generated based on content-aware composition for the use case of a teacher-student remote classroom session.

Use Case Two: Teacher-Student Remote Teaching Session with Notebook-Based Teaching This use cases is depicted in FIG. 4. A student 400 sits at a desk 402 and take notes in a notebook 444 while a teacher uses a Web cam 404 of a computer 408. A camera 410 captures video of the notebook. The processing for this use case is as above. Handwriting on the notebook may be de-skewed and recognized as an optimization, in one embodiment. A composite output frame 500 is shown in FIG. 5 in which the notebook is magnified for viewing and discussion purposes.

As will be appreciated by one skilled in the art, the aspects of the present invention may be embodied as a system, method or computer program product. Accordingly, aspects of the present invention may take the form of an entirely hardware embodiment, an entirely software embodiment (including firmware, resident software, micro-code, etc.), or an embodiment combining software and hardware aspects that may all generally be referred to herein as a "circuit," "module," or "system." Furthermore, aspects of the present invention may take the form of a computer program product embodied in one or more computer readable medium(s) having computer readable program code embodied thereon.

The title, background, brief description of the drawings, abstract, and drawings are hereby incorporated into the disclosure and are provided as illustrative examples of the disclosure, not as restrictive descriptions. It is submitted with the understanding that they will not be used to limit the scope or meaning of the claims. In addition, in the detailed description, it can be seen that the description provides illustrative examples and the various features are grouped together in various implementations for the purpose of streamlining the disclosure. The method of disclosure is not to be interpreted as reflecting an intention that the claimed subject matter requires more features than are expressly recited in each claim. Rather, as the claims reflect, inventive subject matter lies in less than all features of a single disclosed configuration or operation. The claims are hereby incorporated into the detailed description, with each claim standing on its own as a separately claimed subject matter.

The claims are not intended to be limited to the aspects described herein but are to be accorded the full scope consistent with the language claims and to encompass all legal equivalents. Notwithstanding, none of the claims are intended to embrace subject matter that fails to satisfy the requirements of the applicable patent law, nor should they be interpreted in such a way.

What is claimed is:

1. A method, comprising:
   applying at least one image analysis technique to recognize objects in each of at least one input video stream, wherein each of the at least one input video stream is based on a video application use case;
   composing an output frame comprising at least some of the recognized objects, wherein composing the output frame comprising:
      selecting a content aware framing template that includes a plurality of dedicated zones to place the at least some of the recognized objects; and
      placing each object of the at least some of the recognized objects into a respective dedicated zone of the plurality of dedicated zones in the selected content aware framing template; and
   outputting the composed output frame to video client device.

2. The method of claim 1, wherein each object of the at least some of the recognized objects is associated with the respective dedicated zone of the plurality of dedicated zones in the selected content aware framing template.

3. The method of claim 1, further comprising:
   applying at least one content aware modification to the at least some of the recognized objects.

4. The method of claim 1, wherein each of the at least one input video stream is generated by a respective camera of a plurality of cameras configured to capture dedicated aspects of the video application use case.

5. The method of claim 1, further comprising:
   receiving a plurality of input video streams from a plurality of cameras, wherein
      the plurality of input video streams includes the at least one input video stream, and
      each of the plurality of cameras is oriented to capture a different aspect of the video application use case.

6. The method of claim 1, wherein,
   the video application use case is related to a remote training session by a training instructor, and the video application use case related to the remote training session comprising:
tuning at least one video analysis technique to recognize a training instructor's hand, and any objects held in therein; and
modifying any object of the recognized objects in the training instructor's hand based on a content aware rule.

7. The method of claim 6, wherein the modification comprising at least one of handwriting sharpening, object contrast enhancement, image straightening, image magnification, white board sharpening, and object extraction and placement in the output frame, independently of the training instructor.

8. The method of claim 6, wherein the at least one video analysis technique is selected from at least one of artificial intelligence (AI), machine learning (ML), and deep learning.

9. The method of claim 1, wherein,
the video application use case is related to a teacher-student remote teaching session with notebook-based teaching, and
the video application use case related to the remote teaching session comprising:
tuning at least one video analysis technique to recognize objects on a desk of a student; and
modifying any object of the recognized objects on the desk based on a content aware rule.

10. The method of claim 9, wherein the modification comprising at least one of extracting a notebook on the desk for presentation in the output frame independently of said desk, and at least one image enhancement technique to the notebook prior to presentation.

11. The method of claim 10, wherein the at least one image enhancement technique comprises handwriting recognition to recognize a handwriting of the student.

12. A system, comprising:
an object detection module configured to apply at least one image analysis technique to recognize objects in each of at least one input video stream, wherein each of the at least one input video stream is based on a video application use case;
a frame composition module configured to compose an output frame comprising at least some of the recognized objects, wherein composing the output frame comprises:
selecting a content aware framing template that includes a plurality of dedicated zones to place the at least some of the recognized objects; and
placing each object of the at least some of the recognized objects into a respective dedicated zone of the plurality of dedicated zones in the selected content aware framing template; and
a mechanism configured to output the composed output frame to video client device.

13. The system of claim 12, wherein each object of the at least some of the recognized objects is associated with the respective dedicated zone of the plurality of dedicated zones in the selected content aware framing template.

14. The system of claim 12, further comprising a mechanism to apply at least one content aware modification to at least some of the recognized objects.

15. The system of claim 12, further comprising at least one camera configured to capture a dedicated aspect of the video application use case.

16. The system of claim 12, wherein,
the video application use case is related to a remote training session by a training instructor, and
the video application use case related to the remote training session comprising:
at least one video analysis technique tuned to recognize a training instructor's hand, and any objects held in therein; and
a mechanism to modify any object of the recognized objects in the training instructor's hand based on a content aware rule.

17. The system of claim 16, wherein the modification comprising at least one of handwriting sharpening, object contrast enhancement, image straightening, image magnification, white board sharpening, and object extraction and placement in the output frame, independently of the training instructor.

18. The system of claim 16, comprising the at least one video analysis technique provisioned in memory and selected from at least one of artificial intelligence (AI), machine learning (ML), and deep learning.

19. The system of claim 12, wherein the video application use case is related to a teacher-student remote teaching session with notebook-based teaching, and the video application use case related to the remote teaching session comprising:
at least one video analysis technique tuned to recognize objects on a desk of a student; and
a mechanism to modify any object of the recognized objects on the desk based on a content aware rule.

20. A method, comprising:
receiving at least one input video stream from at least one source, wherein each input video stream is based on a video application use case;
applying at least one video analysis technique to recognize a training instructor's hand, and any objects held in therein;
composing an output frame comprising at least some of the recognized objects, wherein composing the output frame comprises:
selecting a content aware framing template that includes a plurality of dedicated zones to place the at least some of the recognized objects;
modifying any object of the recognized objects in the instructor's hand based on a content aware rule; and
outputting the composed output frame to video client device.

* * * * *